(12) United States Patent
Stern et al.

(10) Patent No.: US 10,992,012 B2
(45) Date of Patent: Apr. 27, 2021

(54) CELL FOR AN ELECTRICAL ENERGY STORE

(71) Applicant: Bayerische Motoren Werke Aktiengesellschaft, Munich (DE)

(72) Inventors: Rainer Stern, Ulm (DE); Stefan Roessler, Ulm (DE); Tobias Zeilinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 73 days.

(21) Appl. No.: 16/138,051

(22) Filed: Sep. 21, 2018

(65) Prior Publication Data

US 2019/0027735 A1    Jan. 24, 2019

Related U.S. Application Data

(63) Continuation of application No. PCT/EP2017/053826, filed on Feb. 21, 2017.

(30) Foreign Application Priority Data

Mar. 23, 2016   (DE) .................... 10 2016 204 842.2

(51) Int. Cl.
*H01M 10/48* (2006.01)
*H01M 2/34* (2006.01)
*H01M 50/581* (2021.01)

(52) U.S. Cl.
CPC ....... *H01M 50/581* (2021.01); *H01M 10/486* (2013.01); *H01M 2200/103* (2013.01); *H01M 2220/00* (2013.01); *H01M 2220/20* (2013.01)

(58) Field of Classification Search
CPC ......... H01M 10/48; H01M 2/34; H01M 2/348
See application file for complete search history.

(56) References Cited

U.S. PATENT DOCUMENTS 9,172,079 B2 * 10/2015 Han ..................... H01M 2/348
2003/0077484 A1    4/2003 Cho
(Continued)

FOREIGN PATENT DOCUMENTS

| CN | 1412876 A | 4/2003 |
| CN | 1795280 A | 6/2006 |

(Continued)

OTHER PUBLICATIONS

International Search Report (PCT/ISA/210) issued in PCT Application No. PCT/EP2017/053826 dated May 2, 2017 with English translation (seven pages).

(Continued)

*Primary Examiner* — Karie O'Neill Apicella
(74) *Attorney, Agent, or Firm* — Crowell & Moring LLP

(57) ABSTRACT

A cell for an electrical energy store is provided, including a cell housing within which there is arranged an electrode and on the outer side of which there is arranged a terminal which is galvanically connected to the electrode, wherein an electrical securing element is connected in a current path between the terminal and the electrode for the purposes of galvanic separation of the electrode and of the terminal. The cell is characterized by having the securing element arranged outside the cell housing. In this way, it is possible in a simple manner for the state of charge of the cell to be checked, and also for the cell to be discharged, from the outside.

17 Claims, 2 Drawing Sheets

(56) References Cited

U.S. PATENT DOCUMENTS

| | | |
|---|---|---|
| 2007/0024407 A1 | 2/2007 | Senda et al. |
| 2008/0070067 A1 | 3/2008 | Jang et al. |
| 2011/0081560 A1 | 4/2011 | Kim et al. |
| 2011/0086253 A1 | 4/2011 | Pompetzki et al. |
| 2013/0196179 A1 | 8/2013 | Han et al. |
| 2015/0207133 A1 | 7/2015 | Holl et al. |
| 2015/0340665 A1 | 11/2015 | Kim et al. |
| 2016/0329551 A1 | 11/2016 | Senoo et al. |

FOREIGN PATENT DOCUMENTS

| | | |
|---|---|---|
| CN | 101150204 A | 3/2008 |
| CN | 102027620 A | 4/2011 |
| CN | 102035186 A | 4/2011 |
| CN | 201994346 U | 9/2011 |
| CN | 103247817 A | 8/2013 |
| CN | 104603987 A | 5/2015 |
| CN | 105280847 A | 1/2016 |
| CN | 105280973 A | 1/2016 |
| DE | 10 2008 020 912 A1 | 10/2009 |
| DE | 10 2010 044 455 A1 | 3/2012 |
| DE | 10 2012 210 151 A1 | 12/2013 |
| DE | 10 2012 213 053 A1 | 1/2014 |
| DE | 10 2013 200 923 A1 | 8/2014 |
| DE | 102013200923 A1 * | 8/2014 ............ H01M 2/08 |
| JP | 2006-92988 A | 4/2006 |
| JP | 2015-118756 A | 6/2015 |
| WO | WO 2014/016382 A2 | 1/2014 |

OTHER PUBLICATIONS

German-language Written Opinion (PCT/ISA/237) issued in PCT Application No. PCT/EP2017/053826 dated May 2, 2017 (five pages).

German-language Search Report issued in counterpart German Application No. 10 2016 204 842.2 dated Nov. 16, 2016 with partial English translation (12 pages).

English Translation of Chinese-language Office Action issued in Chinese Application No. 201780004979.1 dated Jun. 12, 2020 (11 pages).

Office Action issued in Chinese Application No. 201780004979.1 dated Jan. 6, 2021 with English translation (14 pages).

* cited by examiner

CELL FOR AN ELECTRICAL ENERGY STORE

CROSS REFERENCE TO RELATED APPLICATIONS

This application is a continuation of PCT International Application No. PCT/EP2017/053826, filed Feb. 21, 2017, which claims priority under 35 U.S.C. § 119 from German Patent Application No. 10 2016 204 842.2, filed Mar. 23, 2016, the entire disclosures of which are herein expressly incorporated by reference.

BACKGROUND AND SUMMARY OF THE INVENTION

The invention relates to a cell for an electrical energy store, having a cell housing within which an electrode is arranged, and on the outer side of which there is arranged a terminal which is galvanically connected to the electrode, wherein a protection element is connected in a current path between the terminal and the electrode, for the purposes of the galvanic separation of the electrode and the terminal.

A cell of this type is described, for example, in German patent document DE 10 2012 210 151 A1.

Customarily, a plurality of cells are mutually interconnected in series and/or in parallel, thereby constituting a battery or an accumulator, or an electrical energy store in general. Depending upon the number and the interconnection of cells, various voltages, currents and energy capacities can be achieved. In one exemplary embodiment, the energy store is a "high-voltage energy store," which is installed in an electric or hybrid vehicle, and is employed for the supply of energy to an electrical drive system of the vehicle.

An energy store is configured, for example, as a lithium-ion accumulator, and customarily comprises a plurality of cells, but at least one single cell which, as a fundamental component, dictates the electrical properties of the energy store. The cell comprises two electrodes, e.g., one of copper and one of aluminum, upon each of which an active material is applied, generally in a coating arrangement, for storing energy. Customarily, the two coated electrodes are mutually spaced apart from each other by a "separator." The electrodes are typically configured in a planar design, as plates or foils, and can either be arranged in a stack or mutually interwound. The electrodes are accommodated in a cell housing which, in particular, also provides mechanical protection. For the electrical bonding of the cell, each of the electrodes within the cell housing is typically connected to an outgoing conductor, which is brought out through the cell housing to the outer side thereof, where it is bonded with a terminal, i.e., a cell terminal. Energy can then be tapped-off or infed via both terminals. In an energy store comprising a plurality of cells, the cells are coupled at the terminals, and are mutually interconnected.

Specifically, in lithium-ion accumulators, but also in electrical energy stores in general, an electrical protection element is appropriately incorporated which, in the event of a failure or malfunction of the energy store, interrupts the electrical connection and prevents further damage, e.g., associated with the burn-out or explosion of one or more cells.

Thus, for example, in the above-mentioned German patent document DE 10 2012 210 151 A1, a battery cell is described having two electrodes which are arranged in a housing, each of which is connected to a terminal on the exterior of the housing. Within the housing, a fusible element is connected in the current path between one of the electrodes and the associated terminal, which constitutes an element of a current interruption device and which, in the event of an unacceptably high current, melts, thereby interrupting the current path.

In German patent document DE 10 2010 044 455 A1, conversely, a fusible element is described which does not constitute part of a respective cell, but which is employed as a connecting element, in order to effect the electrical interconnection of the terminals of two cells, thereby forming a serial or parallel connection of the cells.

In this context, an object of the invention is the disclosure of a cell which is improved with respect to the protection element.

The object is fulfilled according to the invention by a cell having the characteristics described in the independent claim. Advantageous configurations, further developments and variants are the subject matter of the sub-claims.

The cell is designed for application in an electrical energy store, i.e., a battery or an accumulator, e.g., a lithium-ion accumulator. The cell has a cell housing, within which an electrode is arranged, and on the outer side of which there is arranged a terminal which is galvanically connected to the electrode. An electrical protection element is connected in a current path between the terminal and the electrode, for the purposes of the galvanic separation of the electrode and the terminal. The protection element is arranged outside the cell housing.

The protection element is thus an external protection element to the cell. The arrangement of the protection element outside the cell housing provides significant advantages, particularly in comparison with a cell having a protection element which is arranged within the cell housing. The advantages are achieved specifically with respect to the handling of the cell following the tripping of the protection element. Firstly, from the exterior of the cell, with no further action and specifically by eye, it can be seen whether the protection element has tripped or is still intact. This is particularly advantageous in an energy store which is comprised of a plurality of mutually interconnected cells. Secondly, even after the tripping of the protection element, it is still possible to determine the state of charge of the cell, and to execute the controlled discharge thereof, where applicable. Although the terminal can no longer be employed for this purpose, as it is now separated from the associated electrode, the external arrangement of the protection element with respect to the cell housing is such that the bonding of the electrode from the exterior of the cell housing is still possible. As the protection element is connected to the electrode at one end, and this end, even after the tripping thereof, is galvanically connected to the electrode, an external terminal point is provided at this end, by means of which the state of charge of the cell can be controlled in a simple manner, and via which the cell can be further discharged thereafter, where applicable.

In general, the cell incorporates two electrodes, each of which is connected to one terminal of the cell, such that the cell has a two-pole configuration overall. The terminals thus constitute end points of a current path through the cell. The terminals are thus employed for the bonding of the cell, and specifically for the connection thereof with other cells. The electrodes are, for example, configured as coated metal foils or plates, which are arranged in a stack or are mutually interwound. A "separator" is customarily arranged between the electrodes.

The electrodes are arranged in the cell housing, i.e., are enclosed in the latter, and are thus specifically protected against external influences. Bonding of the electrodes is executed by means of the terminals which, to this end, are arranged outside the cell housing. Alternatively, the terminals are a constituent element of the cell housing, i.e., the cell is then directly connected by the cell housing thereof, which functions as a terminal. A combination is also conceivable, wherein the cell is connected on one side by the cell housing thereof, as one of the terminals, and by a further separate terminal. Customarily, one of the terminals is galvanically connected to the cell housing, such that the cell housing lies at the corresponding electrode potential. Conversely, the other terminal is electrically isolated from the cell housing. In one configuration, a bursting membrane is additionally arranged on the cell housing, which ruptures in the event of an overpressure in the interior of the cell, thereby resulting in a pressure equalization. The bursting membrane thus specifically constitutes a mechanical protection element, as opposed to the electrical protection element in the current path, which primarily serves for the electrical protection of the cell.

A respective electrode is connected to one of the terminals, preferably by means of an "outgoing conductor." The outgoing conductor is formed of an electrically-conductive material, and is specifically connected to the electrode in a fixed manner. The outgoing conductor is then connected to the terminal. Overall, the resulting current path runs from one terminal through the associated outgoing conductor and the electrode connected thereto, and from thence to the other electrode, via the outgoing conductor thereof, and finally to the other terminal. Depending upon the position and the configuration of the terminals, the current path is also routed through the cell housing, where applicable. The electrical protection element is arranged along this current path such that, in the event of a short-circuit or an overload, the current path is interrupted. In the normal state and duty of the cell, the current path remains closed by the protection element whereas, in the event of an overload, the current path is interrupted. An overload involves, for example, an excessively high voltage or an excessively high current. The short-circuit or overload is detected by the protection element, and the latter is then tripped, such that the current path is interrupted as a result.

The protection element is arranged in the current path such that, in the normal duty of the cell, a current flows in the protection element. The protection element is integrated in the current path between one of the electrodes and the associated terminal. For the protection of the cell, the protection element is then rated such that, e.g., upon the achievement of a specific maximum permissible current, the protection element is tripped. In general, the protection element has two sides, which are connected by means of a safeguard path, in which the interruption occurs in the event of tripping, such that the two sides are galvanically separated from each other.

Although, after tripping, the current path is interrupted, it is nevertheless possible, due to the special arrangement of the protection element, to check the state of charge of the cell from the exterior, without the necessity for the opening of the cell. To this end, in an appropriate further development, a current tap is connected in the current path between the electrode and the protection element, and is arranged outside the cell housing. Accordingly, that electrode which, by the tripping of the protection element, has now been separated from the associated terminal can still be contacted from the exterior, by the current tap. This is configured, for example, as a pin or a connection head, or in the manner of a terminal, and thus constitutes a pole of the cell. For the checking of the state of charge, an appropriate test device is then connected to the current tap and to the other terminal such that, with respect to the testing of the state of charge, the protection element lies outside the shortened current path which is now employed. The same applies analogously to the discharging of the cell, further to the tripping of the protection element.

Preferably, the protection element is configured as a fusible element, and is thus particularly simple and cost-effective. To this end, the protection element is configured, for example, as a sheet metal component with a safeguard path formed by a tapered section, the specific cross-section of which is such that the melting thereof proceeds in response to a correspondingly high current. Typically, the cross-section ranges between 1 and 5 mm$^2$, although other cross-sections can also be appropriate, depending upon the application. The cross-section dictates a tripping current, with effect from which the protection element is tripped. For example, for the application of the cell in a consumer electronic device, the cross-section is rated for a tripping current in excess of 10 and up to 100 A. In automotive applications, for example, the cross-section is rated for a tripping current in the region of approximately 800 to 1000 A. The protection element is appropriately formed of the same material as the electrode.

Preferably, the cell is configured within the cell housing in a fuseless arrangement. In other words, no further electrical protection element, and specifically no fusible element, is arranged or provided within the cell housing. Electrical protection of the cell is thus executed exclusively outside the cell housing, thereby ensuring that the current path in the interior of the cell remains intact, even after the tripping of the external protection element. Moreover, cells having a protection element in the interior of the housing frequently have a disadvantage in that, upon the tripping thereof, and specifically upon the melting of the protection element, the outgoing conductor is no longer adequately mechanically secured. Inadvertent tilting of the outgoing conductor can result in the restoration of an electrical connection with one of the terminals. Advantageously, this hazard does not arise in a cell housing of a fuseless internal design.

In an appropriate configuration, the electrode is only galvanically connected to the cell housing by the protection element and, with the protection element in the tripped state, the electrode is galvanically isolated from the cell housing. Advantageously, it is thus ensured that, upon the tripping of the protection element, no inadvertent back contacting of the terminal can occur via the housing. This is of general significance in a cell, the cell housing of which is set to the electrode potential of the electrode, and is of particular significance where a fusible element is employed.

Thus, with the cell in its normal state, the cell housing is galvanically connected to the electrode. The terminal is then customarily mounted on the cell housing, and is thus bonded to the electrode. The connection of the terminal is thus achieved indirectly via the cell housing. Correspondingly, the electrode is connected to the cell housing via the protection element. To this end, the protection element is fitted to one side of the cell housing, is specifically attached thereto and, on the other side, e.g., by an outgoing conductor, is connected to the electrode. In the event of the tripping of a fusible element, there is, in principle, a risk that, by the formation of molten material, notwithstanding the separation of the two sides, the side which is bonded to the electrode, by the unfavorable formation of droplets, will continue to be bonded to the cell housing, and thus to the terminal. In the above-mentioned configuration, this is prevented, specifically by the special arrangement of the protection element in relation to the cell housing.

Preferably, the protection element is arranged such that the safeguard path, i.e., in the case of a fusible element the taper, is arranged with a sufficient clearance to the cell housing. By the term "sufficient," it is specifically understood that, between the protection element and the cell housing, an interspace is formed which is sufficiently large to accommodate and/or divert the molten material associated with tripping, with no resulting back contacting. To this end, for example, the outgoing conductor is arranged with a clearance from the outer side of the cell housing, and the protection element diverged from the cell housing in a stepped or ramped arrangement.

Appropriately, the protection element is protected by a cover, by means of which mechanical protection, particularly for the safeguard path, is specifically provided. Particularly in the case of a fusible element, the cover also appropriately serves to maintain the surrounding components in their intended position, and prevents any unintentional collapse or collision of the latter. Specifically, moreover, the cover advantageously executes a function for the controlled routing of the molten material, and thus prevents any spurious back contacting. The cover is specifically formed of an insulating material. The cover is configured, for example, as a cap, and is fitted to or plugged onto the protection element. Appropriately, the cover is removable, in order to permit the checking of the condition of the protection element in a simple manner. Alternatively or additionally, the cover is formed of a transparent material.

In a preferred configuration, the electrode is connected to the protection element by an outgoing conductor, which is routed from the interior to the exterior through a bushing in the cell housing. The function of the outgoing conductor is typically the contacting and retention of the electrode, which is configured, for example, as a stack of a plurality of metal foils. The outgoing conductor thus extends within the cell housing, customarily over the full width of the electrode. A bushing for the outgoing conductor is incorporated in the cell housing, for example in the form of a simple through-hole. The outgoing conductor is then routed through the bushing by a locating projection, e.g., a pin or a bolt. The locating projection is formed of an electrically-conductive material, and appropriately of the same material as the outgoing conductor.

Appropriately, the outgoing conductor and the protection element are permanently mutually attached, thereby resulting in a particularly robust, and specifically leak-tight arrangement. To this end, for example, the locating projection is configured as a rivet, and thus also serves for the attachment of the protection element and the outgoing conductor to each other and to the cell housing. Alternatively, the protection element and outgoing conductor, or alternatively the protection element and the locating projection, are configured in a one-piece arrangement, i.e., as a single component.

Advantageously, the bushing is sealed in relation to the outgoing conductor by a seal. As a result, first, any penetration of moisture or escape of the electrolyte is prevented. Second, specifically in conjunction with the above-mentioned separation of the electrode and the housing, in the event of tripping, the seal also ensures that the electrode or, more accurately, the outgoing conductor is not bonded with the cell housing. Additionally, the seal thus advantageously serves as an electrical insulator for the outgoing conductor in relation to the cell housing, such that these two components are only indirectly mutually bonded by the protection element. Appropriately, the seal is therefore formed of an electrically-insulating material, for example of PE, PP or PTFE.

Preferably, a clearance is maintained between the protection element and the cell housing by an insulator. The insulator is comprised of an electrically-insulating material. This also has an advantage, in that the current path is actually routed through the protection element, and no unwanted alternative current path is constituted. A further advantage is provided in that, in the event of the tripping of the fuse, there is no unwanted contacting with the cell housing. In a first variant, the above-mentioned seal functions as an insulator, and thus additionally as a back contact prevention device. To this end, for example, the seal correspondingly projects outwards from the bushing, and thus maintains a clearance between the safeguard path and the cell housing. In a second variant, the insulator is configured as a separate component, and is spatially arranged between the protection element and the cell housing. The protection element, the insulator and the cell housing, specifically a cover of the cell housing, are respectively configured with a planar design, and constitute a stack. In the second variant, the cell housing, considered from the electrode, is then still connected up-circuit of the protection element in the current path such that, upon the tripping of the protection element, the electrode is still bonded to the cell housing, and only the terminal is separated. The cell housing thus remains at the electrode potential, whereas all the loads which are connected to the terminal, however, are galvanically isolated from the electrode.

In a preferred further development, specifically as an alternative to a protection element which is configured integrally with the outgoing conductor, the protection element is configured as a separate component. The protection element is thus interchangeable. Accordingly, in a modular system, the cell is advantageously configurable with an appropriate protection element, in accordance with requirements in each case. In the assembly of the cell, from a plurality of protection elements, an appropriate protection element is then selected and employed. Accordingly, the protection element is modular. This is particularly advantageous in the context of investigations or tests conducted with various protection elements having, for example, different geometries and/or cross-sections.

In an appropriate configuration, the electrode is connected to the protection element by an outgoing conductor, and the protection element is interchangeably attached to the outgoing conductor and to the terminal by one connecting element, respectively. Advantageously, an interchangeable protection element is produced accordingly. Specifically, the connecting elements are standard components, e.g., bolts with counter nuts, thus permitting the realization of a particularly simple and cost-effective modular design. Appropriately, the connecting elements are respectively fitted through a bushing in the cell housing, as a result of which the overall arrangement is particularly robust.

Preferably, for the purposes of attachment, the connecting element by means of which the protection element is attached to the terminal projects into the cell housing, and is spaced from the latter by an insulating sleeve, i.e., the connecting element is electrically insulated from the cell housing. By means of this connecting element, the terminal and the protection element are thereby attached to the cell housing, but are not electrically bonded to the cell housing by any connecting element. Electrical connection is executed by means of the protection element, which is then specifically electrically bonded to the outgoing conductor by the other connecting element.

The insulating sleeve is configured, for example, as a hollow bolt with an internal thread for the connecting element. Appropriately, the insulating sleeve incorporates a head, which is arranged within the cell housing, and engages with the bushing from the rear, such that the connecting element can be screwed into the insulating sleeve from the exterior and, upon the attachment thereof, the terminal, the protection element, and specifically also the insulator are then compressed against the cell housing.

Exemplary embodiments of the invention are described in greater detail hereinafter with reference to a drawing.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
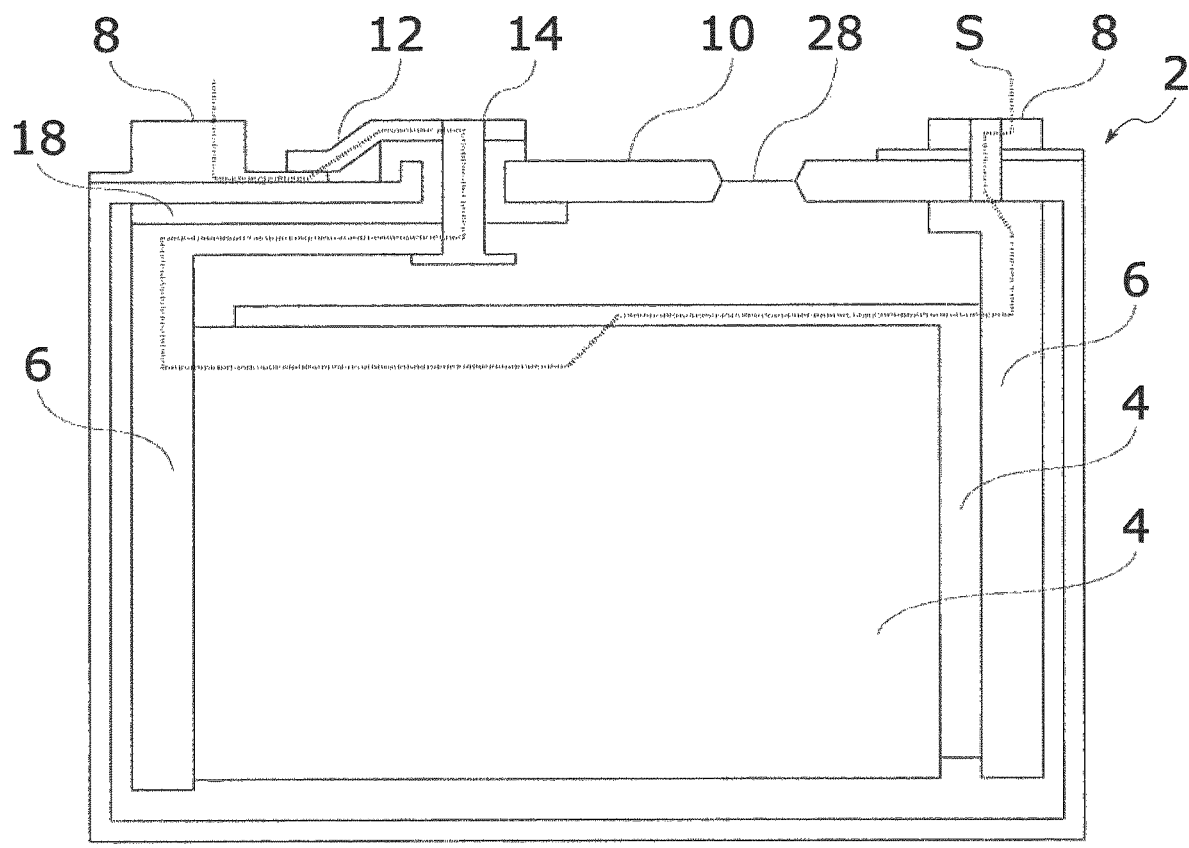
FIG. 1 shows a cell.

FIG. 1 shows a cell 2 with two electrodes 4, to each of which an outgoing conductor 6 is connected which, in turn, is bonded to a terminal 8. The terminals 8 constitute end points of a current path S through the cell 2, and thus also serve as terminal points for the cell 2, for the connection thereof to other cells 2, or to a load. The electrodes 4 are accommodated in a cell housing 10, and are entirely enclosed by the latter. In the exemplary embodiment represented, the electrodes 4 constitute a stack whereas, conversely, in an unrepresented variant, the electrodes 4 are interwound.

For protection against a short-circuit or an overload on the cell 2, an electrical protection element 12, configured in this case as a fusible element, is arranged in the current path S between one of the electrodes 4 and the associated terminal 8. In the normal state of the cell 2, the current path S is closed whereas, conversely, upon the tripping of the protection element 12, the current path S is interrupted at the protection element 12, as a result of which the terminal 8 is galvanically isolated from the associated electrode 4. Within the cell housing 10, conversely, no electrical protection element is arranged, i.e., the cell 2 is configured with a fuseless arrangement on the interior of the cell housing 10.

The protection element 12 is advantageously configured as an external protection element 12, and is arranged outside the cell housing 10, such that it is immediately visible from the exterior whether or not the protection element 12 has tripped. The cell 2 does not need to be opened for this purpose. Moreover, in a simple manner, the state of charge of the cell 2 can continue to be checked further to the tripping of the protection element 12, without the necessity for the opening of the cell 2. To this end, in the exemplary embodiment represented here, a current tap 14 is configured, which is arranged in the current path S between the protection element 12 and the electrode 4, and outside the cell housing 10. The cell 2 can continue to be discharged by this external current tap 14, even with the protection element 12 in the tripped state.

Figure 2:
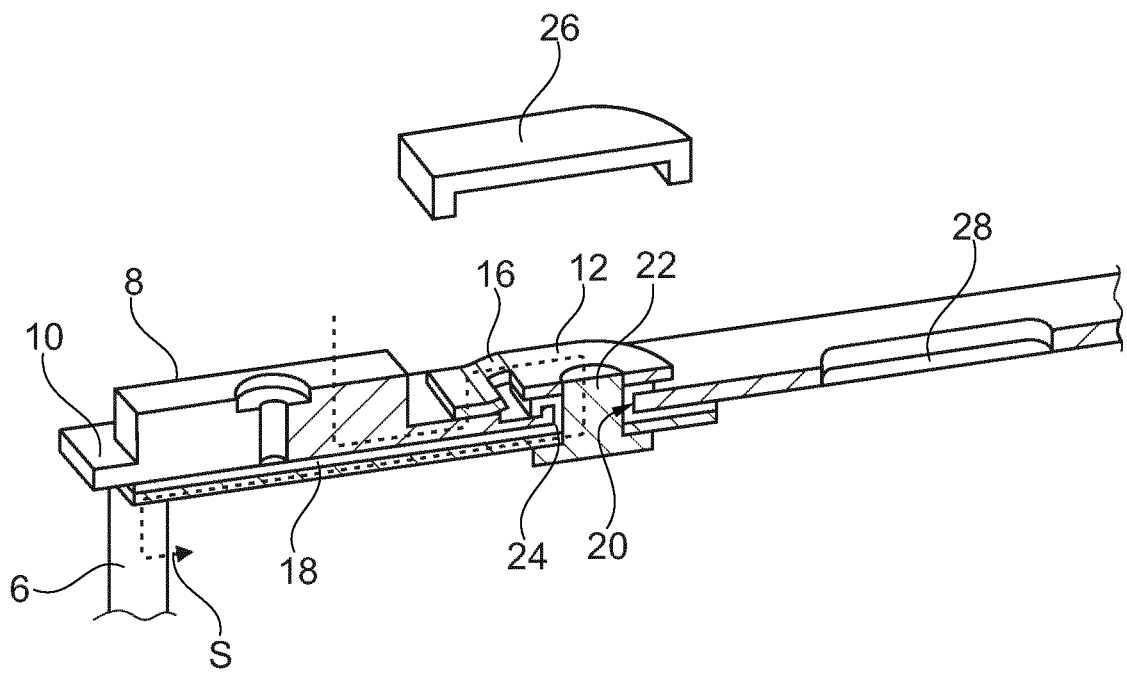
FIG. 2 shows a section of the cell.

In FIG. 2, a section of the cell 2 in the region of the protection element 12 is represented in greater detail, in a cross-sectional view. The configuration thereof as a fusible element having a taper 16, which melts upon the tripping of the fuse, is clearly visible. The outgoing conductor 6 is primarily arranged within the cell housing 10, and is initially galvanically isolated from the latter by an insulator 18. The cell housing 10 incorporates a bushing 20, through which the outgoing conductor 6 is brought out to the exterior by means of a locating projection 22. The outgoing conductor 6 is sealed and simultaneously electrically insulated in relation to the bushing 20 by a seal 24. The seal 24 is also routed through the bushing 20. The seal 24 and the insulator 18 are configured here as a single component, which is formed of an electrically-insulating material.

Externally, the outgoing conductor 6 or, more accurately, the locating projection 22 projects in relation to the cell housing 10. Here, the protection element 12 is attached to the outgoing conductor 6. The protection element 12 is then configured in a ramped arrangement, from the locating projection 22 to the cell housing 10 and is connected to the latter, i.e., is attached to the cell housing 10 at this point. As a result, the cell housing 10 is set to the electrode potential of the electrode 4. The terminal 8 is then also attached to the cell housing 10, in this case by a screw connection, which is not represented in greater detail. Upon the tripping of the protection element 12, the taper 16 melts, such that the cell housing 10 and the terminal 8 are galvanically isolated from the outgoing conductor 6 and the electrode 4. Any unintentional back contacting associated with the molten material produced upon tripping is specifically achieved by the outwardly-projecting locating projection 22, and by the ramped configuration of the protection element 12. As a result, an interspace is constituted between the latter and the cell housing 10, which is bordered by the seal 24 up to the locating projection 22, such that any unwanted contacting with the cell housing 10 is prevented.

In principle, other configurations of the protection element 12 than that indicated above are also appropriate, for example, configurations which do not feature all the characteristics of the exemplary embodiment actually described here. Specifically, it is essential that the current path S runs through the protection element 12, and that the latter is arranged outside the cell housing 10.

In FIG. 2, moreover, a cover 26 is represented, which is fitted to the protection element 12, and thus covers the latter and provides protection against external influences. In FIG. 2, the cover 26 is lifted, such that the protection element 12 is visible. A bursting membrane 28 can also be seen, which is fitted, on the offside of the protection element 12, to the cell housing 10, and fails towards the interior in the event of an overpressure.

Figure 3:
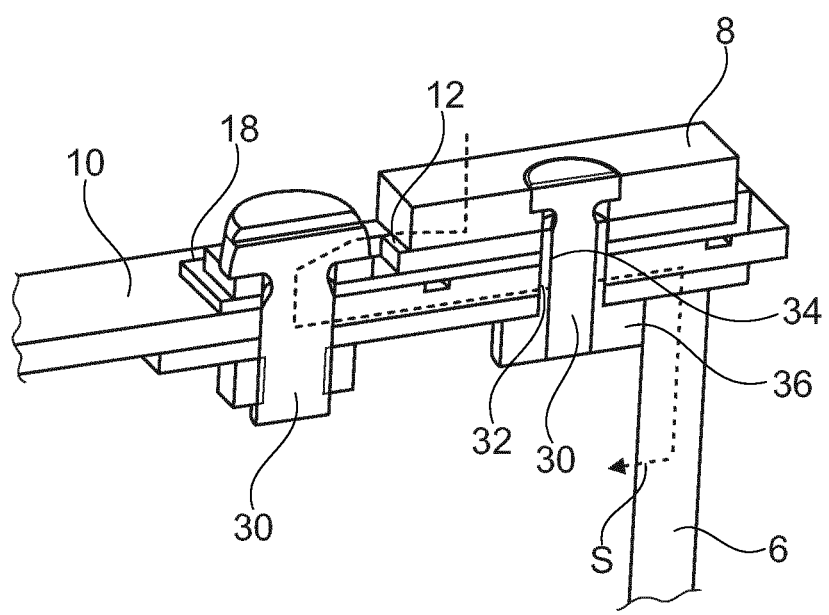
FIG. 3 shows a section of one variant of the cell.

FIG. 3 represents a section of one variant of the cell 2, in a cross-sectional view. The outgoing conductor 6 is directly galvanically connected to the cell housing 10 such that, even after the tripping of the protection element 12, the cell housing 10 remains at the electrode potential of the electrode 4. Conversely, an insulator 18 maintains a clearance between the cell housing 10 and the terminal 8, and the latter is only indirectly connected to the cell housing 10 via the protection element 12.

In FIG. 3, the protection element 12 is configured as a separate component, and is interchangeably attached, namely by two connecting elements 30 which, in this case, are configured as bolts. In the assembly of the cell 2, a specifically optimum and appropriate protection element 12 can be selected and installed in each case. One connecting element 30 serves simultaneously for attachment and for the electrical contacting of the protection element 12 with the cell housing 10 and the outgoing conductor 6. The other connecting element 30 also serves for the attachment of the terminal 8 and, conversely, is enclosed in an insulating sleeve 32, which insulates the terminal 8 and the protection element 12 from the cell housing 10 and the outgoing conductor 6. The current path S, by definition, is thus routed from the terminal 8 through the protection element 12. In this case, the insulating sleeve 32 incorporates an internal thread 34 for the connecting element 30, and a head 36, which lies within the cell 2 and engages with the cell housing 10 from the rear. Overall, the protection element 12 is thus attached and secured on both sides by the connecting elements 30.

LIST OF REFERENCE SYMBOLS

2 Cell
4 Electrode
6 Outgoing conductor
8 Terminal
10 Cell housing
12 Protection element
14 Current tap
16 Taper
18 Insulator
20 Bushing
22 Locating projection
24 Seal
26 Cover
28 Bursting membrane
30 Connecting element
32 Insulating sleeve
34 Internal thread
36 Head
S Current path.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cell for an electrical energy store, comprising:
a cell housing within which an electrode is arranged, and on an outer side of which there is arranged a terminal which is galvanically connected to the electrode, wherein an electrical protection element is connected in a current path between the terminal and the electrode, for the purposes of the galvanic separation of the electrode and the terminal,
wherein the protection element is arranged outside the cell housing,
wherein the electrode is connected to the protection element by an outgoing conductor, and the protection element is interchangeably attached to the outgoing conductor and to the terminal by one connecting element, respectively, and
wherein the connecting element, by which the protection element is attached to the terminal, projects into the cell housing for the purposes of attachment, and is spaced from the cell housing by an insulating sleeve.

2. The cell as claimed in claim 1,
wherein the protection element is configured as a separate element.

3. The cell as claimed in claim 2,
wherein a current tap is connected in the current path between the electrode and the protection element, and is arranged outside the cell housing.

4. The cell as claimed in claim 3,
wherein the protection element is configured as a fusible element.

5. The cell as claimed in claim 3,
wherein the cell is configured within the cell housing in a fuseless arrangement.

6. The cell as claimed in claim 3,
wherein the electrode is only galvanically connected to the cell housing by the protection element and, with the protection element in a tripped state, the electrode is galvanically isolated from the cell housing.

7. The cell as claimed in claim 3,
wherein the protection element is protected by a cover.

8. The cell as claimed in claim 3,
wherein the electrode is connected to the protection element by an outgoing conductor, which is brought out through a bushing in the cell housing to the outer side thereof.

9. The cell as claimed in claim 3,
wherein a clearance is maintained between the protection element and the cell housing by an insulator.

10. The cell as claimed in claim 2,
wherein the protection element is configured as a fusible element.

11. The cell as claimed in claim 2,
wherein the cell is configured within the cell housing in a fuseless arrangement.

12. The cell as claimed in claim 2,
wherein the electrode is only galvanically connected to the cell housing by the protection element and, with the protection element in a tripped state, the electrode is galvanically isolated from the cell housing.

13. The cell as claimed in claim 2,
wherein the electrode is connected to the protection element by an outgoing conductor, which is brought out through a bushing in the cell housing to the outer side thereof.

14. The cell as claimed in claim 13,
wherein the outgoing conductor and the protection element are permanently mutually attached.

15. The cell as claimed in claim 13,
wherein the bushing is sealed in relation to the outgoing conductor by a seal.

16. The cell as claimed in claim 2,
wherein a clearance is maintained between the protection element and the cell housing by an insulator.

17. The cell according to claim 1,
wherein the protection element is protected by a cover that is formed of an insulating material and covers upper and side surfaces of the protection element.

* * * * *